United States Patent [19]

Robinson et al.

[11] Patent Number: 5,085,088
[45] Date of Patent: Feb. 4, 1992

[54] DRIVE TRAIN ENERGY

[76] Inventors: Antonio Robinson, 3850 Hudson Manor Terr. #2B, Riverdale, N.Y. 10463; George Spector, 233 Broadway Room 3815, New York, N.Y. 10007

[21] Appl. No.: 704,788
[22] Filed: May 23, 1991
[51] Int. Cl.⁵ .............................. F16H 33/08
[52] U.S. Cl. .......................... 74/64; 74/572; 74/431; 475/268; 180/165
[58] Field of Search ............... 74/572, 573 R, 64, 431; 475/268; 180/165, 170, 172

[56] References Cited

U.S. PATENT DOCUMENTS

| | | | |
|---|---|---|---|
| 203,623 | 5/1878 | Jay | 74/572 |
| 3,955,429 | 5/1976 | Holden | 74/64 |
| 4,471,668 | 9/1984 | Elsner | 74/572 X |
| 4,495,836 | 1/1985 | Cohen | 74/572 X |
| 4,563,914 | 1/1986 | Miller | 74/572 X |
| 4,588,040 | 5/1986 | Albright, Jr. et al. | 74/572 X |
| 4,811,625 | 3/1989 | Sorg et al. | 74/572 |
| 4,926,107 | 5/1990 | Pinson | 74/572 X |
| 4,928,553 | 5/1990 | Wagner | 475/268 |

Primary Examiner—Leslie A. Braun
Assistant Examiner—William O. Trousdell

[57] ABSTRACT

A drive train energy system is provided for a motor vehicle of the type having a drive shaft which rotates a drive shaft pinion that is transversely engaged with a differential crown wheel which operates a rear axle and a pair of wheels. The drive train energy system consists of a second crown wheel mounted to the drive shaft proximate the drive shaft pinion, with a second pinion transversely engaged with the second crown wheel. A driven shaft is connected to the second pinion, while a flywheel is connected to the driven shaft to be rotated thereby. A plurality of flyballs are spaced apart and pivotally connected to the flywheel so that when the flywheel is rotated and reaches a predetermined speed, the flyballs will pivot outwardly from the flywheel to increase the momentum of the flywheel to help maintain the speed of the rear wheels of the motor vehicle at higher speeds.

4 Claims, 1 Drawing Sheet

DRIVE TRAIN ENERGY

BACKGROUND OF THE INVENTION

The instant invention relates generally to differential gear drives and more specifically it relates to a drive train energy system which provides a mechanism to help maintain the wheel speed of a motor vehicle at high speeds.

There are available various conventional differential gear drives which do not provide the novel improvements of the invention herein disclosed.

SUMMARY OF THE INVENTION

A primary object of the present invention is to provide a drive train energy system that will overcome the shortcomings of the prior art devices.

Another object is to provide a drive train energy system that includes a flywheel with a plurality of pivotally connected flyballs geared to the drive shaft of a motor vehicle to help maintain the wheel speed of the motor vehicle at high speeds.

An additional object is to provide a drive train energy system that includes a clutch disposed between the flywheel and the flywheel pinion on the flywheel driven shaft so as to disengage the flywheel when the motor vehicle is traveling at slower speeds.

A further object is to provide a drive train energy system that is simple and easy to use.

A still further object is to provide a drive train energy system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
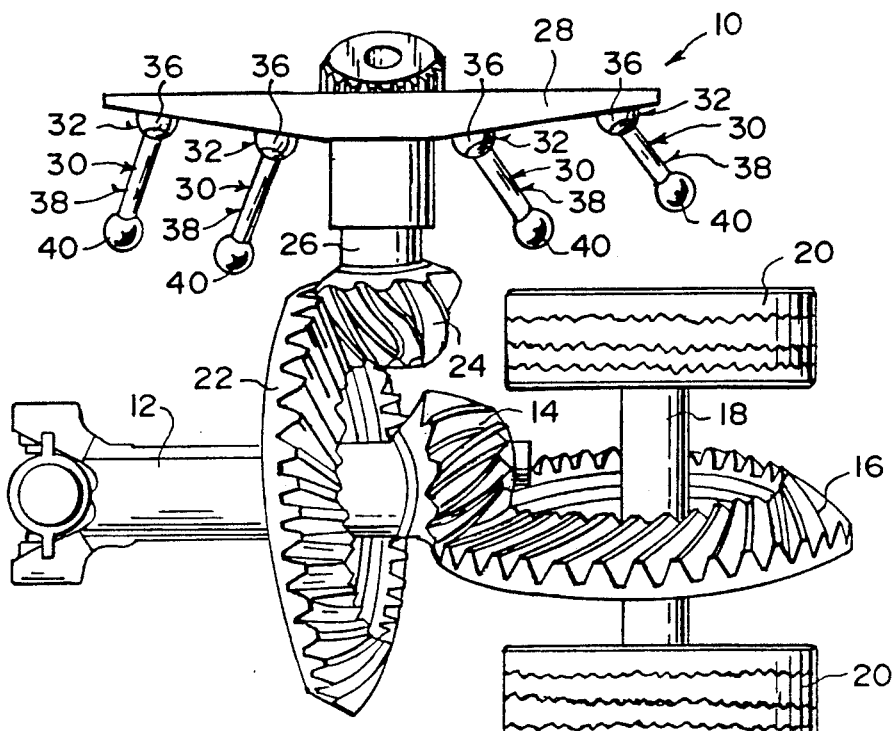
FIG. 1 is a diagrammatic view partly in perspective of the instant invention.

Turning now descriptively to the drawings, in which similar reference characters denote similar elements throughout the several views, the Figures illustrate a drive train energy system 10 for a motor vehicle of the type having a drive shaft 12 which rotates a drive shaft pinion 14 that is transversely engaged with a differential crown wheel 16 which operates a rear axle 18 and a pair of wheels 20. The drive train energy system 10 consists of a second crown wheel 22 mounted to the drive shaft 12 proximate the drive shaft pinion 14, with a second pinion 24 transversely engaged with the second crown wheel 22. A driven shaft 26 is connected to the second pinion 24, while a flywheel 28 is connected to the driven shaft 26 to be rotated thereby. A plurality of flyballs 30 are spaced apart and pivotally connected at 32 to the flywheel 28 so that when the flywheel 28 is rotated and reaches a predetermined speed, the flyballs 30 will pivot outwardly from the flywheel 28 to increase the momentum of the flywheel 28 to help maintain the speed of the rear wheels 20 of the motor vehicle at higher speeds.

Figure 2:
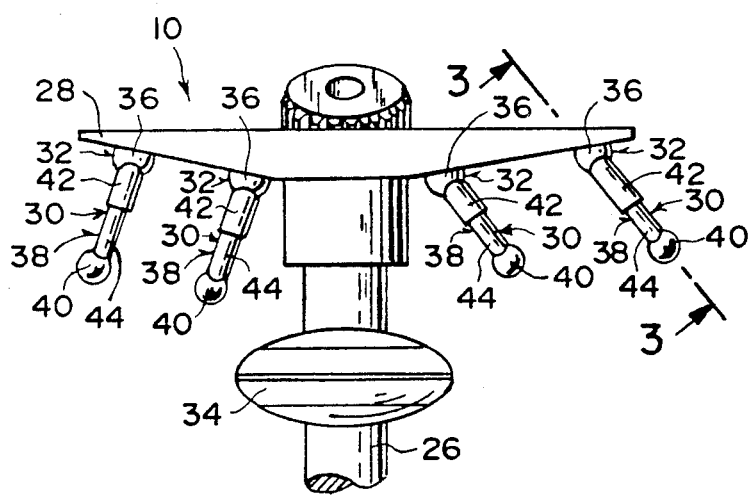
FIG. 2 is a diagrammatic view partly in perspective of a portion of a modification showing a clutch between the flywheel and the flywheel pinion on the flywheel shaft in which the clutch is manually operated at slower speeds to disengage the flywheel.

As shown in FIG. 2, the drive train energy system 10 further includes a clutch 34, located on the driven shaft 26 between the second pinion 24 and the flywheel 28, so that the clutch 34 can be operated at slower speeds to disengage the flywheel 28 when not needed, such as in heavy traffic conditions. The brake of the motor vehicle should have a switch to disengage the clutch 34 because the system 10 produces a great amount of power to the differential crown wheel 16.

Figure 3:
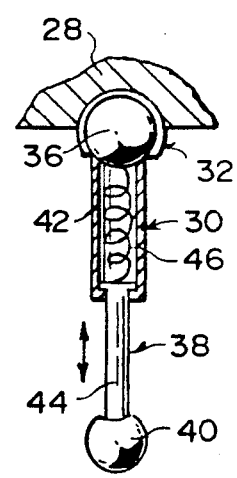
FIG. 3 is a cross sectional view taken along line 3—3 in FIG. 2 showing one of the flyballs with a telescopic rod and a spring inside to resist outward movement of the telescopic rod.

Each flyball 30 includes a ball and socket member 36 to pivotally connect to the flywheel 28. An arm 38 extends from the ball and socket member 36, while a cylindrical weight 40 is affixed to the distal end of the arm 38 to help the flyball 30 to pivot outwardly from the flywheel 28. The arm 38 of each flyball 30 in FIGS. 2 and 3 can include a hollow sleeve 42 affixed at a first end to the ball and socket member 36, while a telescopic rod 44 extends outwardly from a second open end of the hollow sleeve 42 and is affixed at its distal end to the cylindrical weight 40. A compression spring 46 is connected between the internal end of the telescopic rod 44 and the ball and socket member 36 within the hollow sleeve 42 to resist an outward movement of the telescopic rod 44 so that when the flywheel 28 rotates faster the telescopic rod 44 will then extend outwardly further from the open end of the hollow sleeve 42.

Typically there are four flyballs 30 on the flywheel 28, but any other amount can be utilized. The second pinion 24 normally contains one third the teeth as the second crown wheel 22, so that if the second crown wheel 22 rotates at three hundred revolutions per minute, the second pinion will rotate three times faster at nine hundred revolutions per minute. When the motor vehicle reaches twenty miles per hour, the flywheel 28 with the expansive force of the flyballs 30 will extend the transmitting drive train energy reducing the engine resistance producing an economy saving of thirty percent for operating the engine.

Another drive train energy system (not shown) can also be placed in engagement with the differential crown wheel 16. This system will also work, but it will be slower in rotation.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A drive train energy system for use in a motor vehicle, said system comprising a drive shaft, a drive shaft pinion being rotatably driven by said drive shaft, a differential crown wheel in transversely engaged relationship with said drive shaft pinion, said differential crown wheel being operable to drive a rear axle and a pair of wheels, said drive train energy system further comprising:
a) a second crown wheel mounted to the drive shaft proximate the drive shaft pinion;
b) a second pinion transversely engaged with said second crown wheel;
c) a driven shaft connected to said second pinion;
d) a flywheel connected to said driven shaft to be rotated thereby; and
e) a plurality of flyballs spaced apart and pivotally connected to said flywheel so that when said flywheel is rotated and reaches a predetermined speed, said flyballs will pivot outwardly from said flywheel to increase the momentum of said flywheel to help maintain the speed of the rear wheels of the motor vehicle at higher speeds.

2. A drive train energy system as recited in claim 1, further including a clutch located on said driven shaft between said second pinion and said flywheel so that said clutch can be operated at slower speeds to disengage said flywheel when not needed, such as in heavy traffic conditions.

3. A drive train energy system as recited in claim 1, wherein each said flyball includes:
a) a ball and socket member to pivotally connected to said flywheel;
b) an arm extending from said ball and socket member; and
c) a cylindrical weight affixed to the distal end of said arm to help said flyball to pivot outwardly from said flywheel.

4. A drive train energy system as recited in claim 3, wherein said arm of each said flyball includes:
a) a hollow sleeve affixed at a first end to said ball and socket member;
b) a telescopic rod extending outwardly from a second open end of said hollow sleeve and affixed at its distal end to said cylindrical weight; and
c) a compression spring connected between the internal end of said telescopic rod and said ball and socket member within said hollow sleeve to resist an outward movement of said telescopic rod so that when said flywheel rotates faster said telescopic rod will then extend outwardly further from the open end of said hollow sleeve.

* * * * *